United States Patent
Kawahara et al.

(10) Patent No.: US 9,531,022 B2
(45) Date of Patent: Dec. 27, 2016

(54) FUEL CELL SYSTEM AND CONTROL METHOD THEREOF

(71) Applicant: TOYOTA JIDOSHA KABUSHIKI KAISHA, Toyota-shi, Aichi-ken (JP)

(72) Inventors: Shuya Kawahara, Gotemba (JP); Keigo Suematsu, Toyota (JP); Masashi Toida, Nagoya (JP); Ryota Akaboshi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/890,444

(22) PCT Filed: Apr. 23, 2014

(86) PCT No.: PCT/JP2014/002288
§ 371 (c)(1),
(2) Date: Nov. 11, 2015

(87) PCT Pub. No.: WO2014/185016
PCT Pub. Date: Nov. 20, 2014

(65) Prior Publication Data
US 2016/0079621 A1      Mar. 17, 2016

(30) Foreign Application Priority Data
May 17, 2013   (JP) .................................. 2013-104905

(51) Int. Cl.
*H01M 8/04*    (2016.01)

(52) U.S. Cl.
CPC ..... *H01M 8/04768* (2013.01); *H01M 8/04074* (2013.01); *H01M 8/04253* (2013.01);
(Continued)

(58) Field of Classification Search
None
See application file for complete search history.

(56) References Cited

U.S. PATENT DOCUMENTS

| | | |
|---|---|---|
| 2007/0059570 A1 | 3/2007 | Miyata et al. |
| 2012/0003557 A1 | 1/2012 | Tanaka et al. |
| 2012/0015272 A1 | 1/2012 | Naganuma et al. |

FOREIGN PATENT DOCUMENTS

| | | |
|---|---|---|
| JP | 2004-319265 A | 11/2004 |
| JP | 2005-032587 A | 2/2005 |

(Continued)

*Primary Examiner* — Jonathan Crepeau
(74) *Attorney, Agent, or Firm* — Andrews Kurth Kenyon LLP

(57) ABSTRACT

A fuel cell system comprises a fuel cell stack, a circulation flow path of a cooling medium, a pump provided in the circulation flow path, a supply-side temperature sensor provided to detect a supplied cooling medium temperature, a discharge-side temperature sensor provided to detect a discharged cooling medium temperature, and a cold-start controller configured to control a circulation volume of the cooling medium by the pump at a cold start of the fuel cell stack. The cold-start controller estimates a fuel cell internal temperature and selectively sets the circulation volume of the cooling medium between a reduced volume and a normal volume, based on a magnitude relationship between the internal temperature and the discharged cooling medium temperature. When the supplied cooling medium temperature becomes equal to the discharge cooling medium temperature after setting the circulation volume, the cold-start controller sets the circulation volume of the cooling medium to an increased volume (maximum circulation volume).

5 Claims, 2 Drawing Sheets

(52) U.S. Cl.
CPC ... *H01M 8/04268* (2013.01); *H01M 8/04358* (2013.01); *Y02E 60/50* (2013.01)

(56) References Cited

FOREIGN PATENT DOCUMENTS

| | | | |
|---|---|---|---|
| JP | 2006-059585 | * | 3/2006 |
| JP | 2006-310073 A | | 11/2006 |
| JP | 2007-073378 A | | 3/2007 |
| JP | 2009-054427 A | | 3/2009 |
| JP | 2010-123493 A | | 6/2010 |
| JP | 2010-129353 A | | 6/2010 |
| JP | 2010-186599 A | | 8/2010 |
| JP | 2010-277704 A | | 12/2010 |
| JP | 2012-048834 A | | 3/2012 |
| JP | 2012-113848 A | | 6/2012 |

* cited by examiner

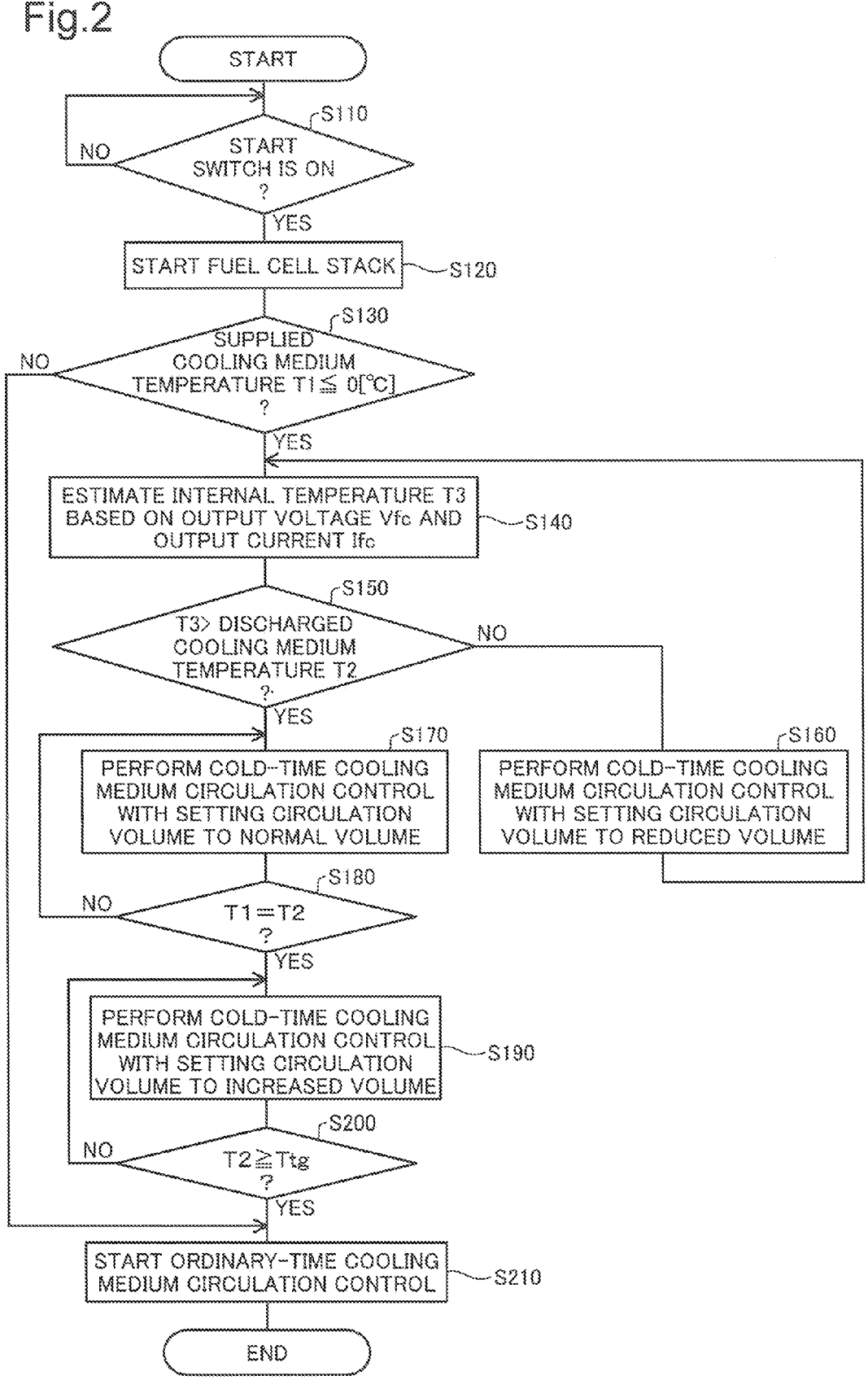

FUEL CELL SYSTEM AND CONTROL METHOD THEREOF

CROSS-REFERENCE TO RELATED APPLICATIONS

This is a national phase application based on the PCT International Patent Application No. PCT/JP2014/002288 filed Apr. 23, 2014, claiming priority to Japanese Patent Application No. 2013-104905 filed May 17, 2013, the entire contents of both of which are incorporated herein by reference.

TECHNICAL FIELD

The present invention relates to a fuel cell system including a fuel cell stack and a control method of the fuel cell system.

BACKGROUND

At a start of a fuel cell stack in a fuel cell system, a conventionally proposed technique stops the operation of a pump for cooling water and thereby stops circulation of the cooling water, when the internal temperature of the fuel cell is equal to or lower than 0° C. (for example, Patent Literature 1). This proposed technique increases the heat value immediately after a sub-zero start and increases the rate of temperature rise of the fuel cell stack, so as to shorten the starting time.

CITATION LIST

Patent Literature

PTL 1: JP 2010-186599A

SUMMARY

Technical Problem

The above prior art, however, has a problem that continuing the stop of circulation of the cooling water causes a slower temperature rise part in the stacking direction of the fuel cell stack and fails to achieve a uniform temperature rise in the entire fuel cell stack. Other needs include increase in rate of temperature rise, easy manufacture and improved usability.

Solution to Problem

The invention may be implemented by any of the following aspects, in order to solve at least part of the above problems.

(1) According to one aspect of the invention, there is provided a fuel cell system. The fuel cell system, comprising: a fuel cell stack that is configured to have a cooling medium supply port and a cooling medium discharge port; a circulation flow path that is arranged to return a cooling medium which is discharged from the cooling medium discharge port, to the cooling medium supply port; a pump that is provided to drive the cooling medium in the circulation flow path and thereby circulate the cooling medium to inside of the fuel cell stack, the pump being configured to vary a circulation volume of the cooling medium; a supply-side temperature sensor that is configured to detect a supplied cooling medium temperature which is temperature of the cooling medium supplied to the cooling medium supply port; a discharge-side temperature sensor that is configured to detect a discharged cooling medium temperature which is temperature of the cooling medium discharged from the cooling medium discharge port; and a cold-start controller that is configured to control the circulation volume of the cooling medium by the pump at a cold start of the fuel cell stack. The cold-start controller is configured to obtain a fuel cell internal temperature which is temperature inside of the fuel cell stack, selectively set the circulation volume of the cooling medium between a first circulation volume and a second circulation volume that is greater than the first circulation volume, based on a magnitude relationship between the fuel cell internal temperature and the discharged cooling medium temperature, and set the circulation volume of the cooling medium to a third circulation volume that is greater than the second circulation volume, when the supplied cooling medium temperature becomes equal to the discharged cooling medium temperature after setting the circulation volume.

According to the fuel cell system of this aspect, the circulation volume of the cooling medium is set to the smallest first circulation volume among the first to the third circulation volumes, based on the magnitude relationship between the fuel cell internal temperature and the discharged cooling medium temperature. This increases the rate of temperature rise of the fuel cell stack. When the supplied cooling medium temperature becomes equal to the discharged cooling medium temperature, the circulation volume of the cooling medium is set to the largest third circulation volume among the first to the third circulation volumes. This achieves a uniform temperature rise in the stacking direction of the fuel cell stack. Accordingly, the fuel cell system of this aspect satisfies both the increase in rate of temperature rise of the fuel cell stack and the uniform temperature rise of the entire stack.

(2) In the fuel cell system of the above aspect, the cold-start controller may be configured to obtain a heat value of the fuel cell stack based on an output voltage and an output current of the fuel cell stack and estimate the fuel cell internal temperature based on the heat value and a heat capacity of the fuel cell stack, so as to obtain the fuel cell internal temperature. The fuel cell system of this aspect obtains the fuel cell internal temperature with high accuracy.

(3) In the fuel cell system of the above aspect, the cold-start controller is configured to terminate the control of the circulation volume of the cooling medium at the cold start, when the discharged cooling medium temperature reaches a predetermined warm-up target temperature. The fuel cell system of this aspect allows for a changeover from the cold-start control to ordinary control at an adequate timing.

(4) In the fuel cell system of the above aspect, the third circulation volume is a maximum circulation volume by the pump. The fuel cell system of this aspect further effectively achieves a uniform temperature rise in the stacking direction of the fuel cell stack.

(5) According to another aspect of the invention, there is provided a control method of a fuel cell system. The control method of a fuel cell system, the fuel cell system comprising a fuel cell stack that is configured to have a cooling medium supply port and a cooling medium discharge port; a circulation flow path that is arranged to return a cooling medium which is discharged from the cooling medium discharge port, to the cooling medium supply port; a pump that is provided to drive the cooling medium in the circulation flow path and thereby circulate the cooling medium to inside of the fuel cell stack, the pump being configured to vary a circulation volume of the cooling medium; a supply-side temperature sensor that is configured to detect a supplied cooling medium temperature which is temperature of the cooling medium supplied to the cooling medium supply port; and a discharge-side temperature sensor that is configured to detect a discharged cooling medium temperature which is temperature of the cooling medium discharged from the cooling medium discharge port. The control method comprising: at a cold start of the fuel cell stack, obtaining a fuel cell internal temperature which is temperature inside of the fuel cell stack; selectively setting the circulation volume of the cooling medium by the pump between a first circulation volume and a second circulation volume that is greater than the first circulation volume, based on a magnitude relationship between the fuel cell internal temperature and the discharged cooling medium temperature; and setting the circulation volume of the cooling medium to a third circulation volume that is greater than the second circulation volume, when the supplied cooling medium temperature becomes equal to the discharged cooling medium temperature after setting the circulation volume. Like the fuel cell system described above, the control method of the fuel cell system according to this aspect satisfies both the increase in rate of temperature rise of the fuel cell stack and the uniform temperature rise of the entire stack.

The invention may be implemented by any of various aspects other than the above aspects of the fuel cell system and the control method of the fuel cell system. For example, the invention may be configured as a vehicle with the fuel cell system of the above aspect mounted thereon.

BRIEF DESCRIPTION OF DRAWINGS

FIG. 2 is a flowchart showing a start-time control routine performed by a controller 90.

Figure 1:
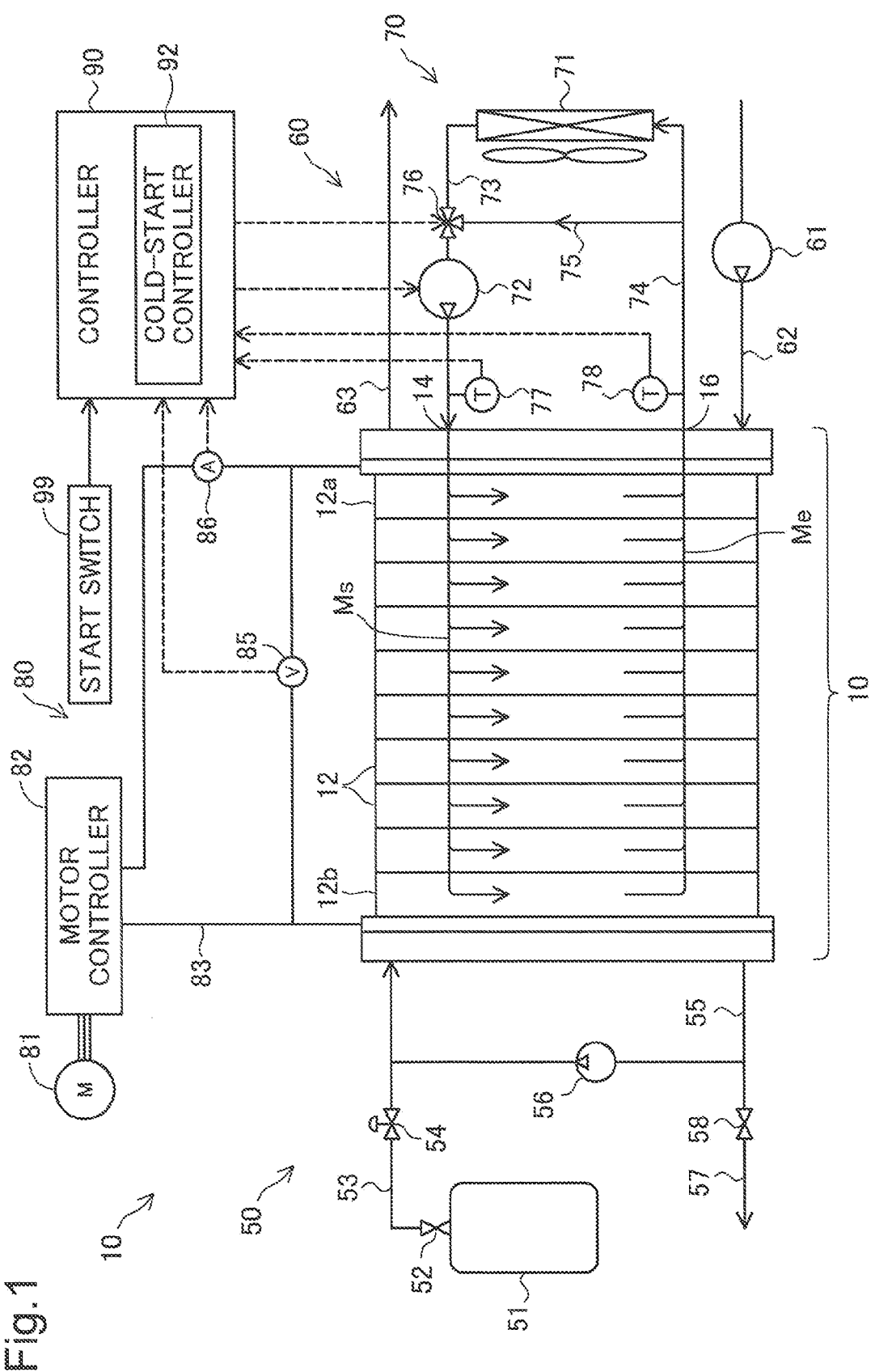
FIG. 1 is a diagram illustrating the schematic configuration of a fuel cell system according to one embodiment of the invention.

The following describes embodiments of the invention.

DESCRIPTION OF EMBODIMENTS

A. General Configuration of Fuel Cell System

FIG. 1 is a diagram illustrating the schematic configuration of a fuel cell system according to one embodiment of the invention. In the illustrated example, this fuel cell system 100 is mounted on a vehicle that uses the electric power generated by a fuel cell stack as driving power (hereinafter referred to as "fuel cell vehicle"). The fuel cell system 100 includes a fuel cell stack 10, a hydrogen gas supply-discharge system 50 that is configured to supply hydrogen gas to the fuel cell stack 10, an oxidizing gas supply-discharge system 60 that is configured to supply the air including oxygen to the fuel cell stack 10, a cooling medium circulation system 70 that is configured to circulate a cooling medium and thereby cool down the fuel cell stack 10, a power output system 80 that is configured to convert the electric power by the fuel cell stack 10 into motive power, and a controller 90 that is configured to control the entire fuel cell system 100.

The fuel cell stack 10 has a stack structure by stacking a plurality of fuel cells (hereinafter simply called "cells") as unit modules of power generation. The type of the fuel cell herein may be any of various different types of fuel cells. This embodiment employs polymer electrolyte fuel cells.

Each cell 12 includes a membrane electrode assembly (called MEA) in which an anode electrode and a cathode electrode are formed on respective surfaces of an electrolyte membrane. Each cell 12 also includes gas diffusion layers that are arranged on either side of the MEA to diffuse and supply the hydrogen gas and the air as reactive gases to the MEA. Each cell 12 of the fuel cell stack 10 generates electricity by electrochemical reaction of the hydrogen gas with oxygen included in the air. According to this embodiment, the respective cells 12 have identical configurations and specifications.

The hydrogen gas supply-discharge system 50 includes a hydrogen tank 51, a pressure reducing valve 52, a hydrogen gas supply path 53, a pressure regulator 54, an anode off-gas path 55, a hydrogen pump 56, an off-gas discharge path 57 and an on-off valve 58. In the hydrogen gas supply-discharge system 50, hydrogen as the fuel gas stored in the hydrogen tank 51 is depressurized by the pressure reducing valve 52 and is released to the hydrogen gas supply path 53. In the hydrogen gas supply-discharge system 50, the hydrogen released to the hydrogen gas supply path 53 is regulated to have a specified pressure by the pressure regulator 54 provided in the hydrogen gas supply path 53 and is supplied to the anodes of the fuel cell stack 10. In the hydrogen gas supply-discharge system 50, the anode off-gas flowing out to the anode off-gas path 55 is resupplied to the hydrogen gas supply path 53 by the hydrogen pump 56. In the hydrogen gas supply-discharge system 50, part of the anode off-gas is discharged out of the system by setting the on-off valve 58 provided in the off-gas discharge path 57 which is branched off from the anode off-gas path 55, to the on position.

The oxidizing gas supply-discharge system 60 includes an air compressor 61, an oxidizing gas supply path 62, and a cathode off-gas path 63. In the oxidizing gas supply-discharge system 60, the air taken in from the outside as the oxidizing gas is pressurized by the air compressor 61 and is supplied through the oxidizing gas supply path 62 to the cathodes of the fuel cell stack 10. In the oxidizing gas supply-discharge system 60, the cathode off-gas flowing out to the cathode off-gas path 63 is discharged through the cathode off-gas path 63 out of the fuel cell stack 10.

The cooling medium circulation system 70 includes a radiator 71, a circulation pump 82, a cooling medium supply flow path 73, a cooling medium discharge flow path 74, a bypass flow path 75, a rotary valve 76, a supply-side temperature sensor 77 and a discharge-side temperature sensor 78. The cooling medium supply flow path 73 has an upstream end that is connected with the radiator 71 and a downstream end that is connected with a cooling medium supply port 14 of the fuel cell stack 10. The rotary valve 76, the circulation pump 72 and the supply-side temperature sensor 77 are provided in this sequence from the upstream side to the downstream side in the cooling medium supply flow path 73. The cooling medium discharge flow path 74, on the other hand, has an upstream end that is connected with a cooling medium discharge port 16 of the fuel cell stack 10 and a downstream end that is connected with the radiator 71. The discharge-side temperature sensor 78 is provided in the cooling medium discharge flow path 74. The bypass flow path 75 has an upstream end that is connected with the cooling medium discharge flow path 74 and a downstream end that is connected with the rotary valve 76.

In the cooling medium circulation system 70, the cooling medium cooled by the radiator 71 is pressure-fed by the circulation pump 72 and is supplied through the cooling medium supply flow path 73 to the fuel cell stack 10. The cooling medium supplied to the fuel cell stack 10 is introduced from the cooling medium supply port 14 through a cooling medium supply manifold Ms to the respective cells 12 to cool down the respective cells 12. After cooling down the respective cells 12, the cooling medium is gathered through a cooling medium discharge manifold Me and is discharged from the cooling medium discharge port 16 to the cooling medium discharge flow path 74.

In the cooling medium circulation system 70, the cooling medium discharged from the fuel cell stack 10 to the cooling medium discharge flow path 74 is circulated to the radiator 71. In the cooling medium circulation system 70, the cooling medium circulated to the radiator 71 is resupplied to the fuel cell stack 10. In the cooling medium circulation system 70, the rotary valve 76 may be changed over such that the cooling medium discharged from the fuel cell stack 10 to the cooling medium discharge flow path 74 is resupplied to the fuel cell stack 10 through the cooling medium supply flow path 73 without passing through the radiator 71. The circulation volume of the cooling medium in the cooling medium circulation system 70 may be varied by regulating the driving force for circulating the cooling medium or the ejection force of the circulation pump 72.

The supply-side temperature sensor 77 is located in the vicinity of the downstream end of the cooling medium supply flow path 73 or, in other words, in the vicinity of the cooling medium supply port 14 of the fuel cell stack 10 to detect the temperature of the cooling medium supplied to the fuel cell stack 10 (hereinafter called "supplied cooling medium temperature T1"). The discharge-side temperature sensor 78 is located in the vicinity of the upstream end of the cooling medium discharge flow path 74 or, in other words, in the vicinity of the cooling medium discharge port 16 of the fuel cell stack 10 to detect the temperature of the cooling medium discharged from the fuel cell stack 10 (hereinafter called "discharged cooling medium temperature T2"). According to this embodiment, the cooling medium used may be water or a liquid mixture of water and ethylene glycol.

The power output system 80 includes a motor 81, a motor controller 82 and an electric wiring 83 arranged to supply the electric power from the fuel cell stack 10 to the motor controller 82. The motor 81 serves as a main power source of the fuel cell vehicle. The motor controller 82 controls the output of electric power (discharge) from the fuel cell stack 10. As a result, the power output system 80 converts the electric power generated by the fuel cell stack 10 into power for driving the fuel cell vehicle. The power output system 80 also includes a voltage sensor 85 configured to detect an output voltage Vfc of the fuel cell stack 10 and a current sensor 86 configured to detect an output current Ifc of the fuel cell stack 10.

The controller 90 is implemented by a computer including a CPU and memories (not shown). The controller 90 receives signals from temperature sensors, pressure sensors, switches and the like provided in different parts of the fuel cell system 100, as well as signals from the voltage sensor 85, the current sensor 86, the supply-side temperature sensor 77 and the discharge-side temperature sensor 78, and controls the overall fuel cell system 100 in response to the received signals. The switches include a start switch 99 provided to start the fuel cell vehicle.

The controller 90 according to this embodiment includes a cold-start controller 92, as a functional element corresponding to part of the overall control of the fuel cell system 100, to control the cooling medium circulation system 70 at a cold start of the fuel cell stack 10. The following describes the detailed configuration of the cold-start controller 92.

B. Start-Time Control Routine

FIG. 2 is a flowchart showing a start-time control routine performed by the controller 90. This start-time control routine is performed with dark current prior to a start of the fuel cell vehicle. As illustrated, on start of this routine, the controller 90 first determines whether the start switch 99 is in the on position (step S110). When it is determined that the start switch 99 is not in the on position but is in the off position, the controller 90 repeats the processing of step S110 to wait for the operator's operation of the start switch 99 to the on position.

When it is determined at step S110 that the start switch 99 is in the on position, the controller 90 starts the fuel cell stack 10 (step S120). More specifically, the controller 90 controls the hydrogen gas supply-discharge system 50 and the oxidizing gas supply-discharge system 60 to supply the air and the hydrogen gas to the fuel cell stack 10 and thereby starts power generation by the fuel cell stack 10.

The controller 90 subsequently determines whether the supplied cooling medium temperature T1 detected by the supply-side temperature sensor 77 is equal to or lower than 0[° C.] (step S130). This determines whether the ambient temperature of the fuel cell system 100 is below zero, based on the temperature of the cooling medium remaining in the cooling medium supply flow path 73. When it is determined at step S130 that the supplied cooling medium temperature T1 is equal to or lower than 0[° C.], the controller 90 proceeds to step S140 and a subsequent series of processing for a cold start.

The threshold value of 0[° C.] at step S130 is used as the criterion to identify a cold state in which the temperature of the fuel cell is not higher than the freezing point of water. The threshold value is, however, not limited to 0[° C.] but may be another temperature below 0[° C.], for example, −2[° C.] or −4[° C.]. The temperature as the object of determination at step S130 may be the discharged cooling medium temperature T2 detected by the discharge-side temperature sensor 78, in place of the supplied cooling medium temperature T1. Another configuration may use any other sensor configured to detect a parameter reflecting the temperature of the fuel cell stack, for example, a temperature sensor provided outside of the fuel cell system 100.

At step S140, the controller 90 estimates an internal temperature T3 of the fuel cell stack, based on the output voltage Vfc detected by the voltage sensor 85 and the output current Ifc detected by the current sensor 86. The internal temperature T3 of the fuel cell stack 10 may be attributed to a loss in power generation. The loss corresponds to a difference (loss voltage) between theoretical electromotive voltage and actual output voltage, and the product of the loss voltage and the output current provides loss power and causes heat generation. Accumulation of such heat generation increases the internal temperature. Accordingly the internal temperature T3 of the fuel cell stack 10 may be estimated, for example, according to Equation (1) given below:

$$T3 = \Sigma Q/C + Tst \quad (1)$$

where ΣQ represents integration of heat value [kJ] of the fuel cell stack 10, C represents heat capacity [kJ/K] of the fuel cell stack 10, and Tst represents internal temperature prior to start of the fuel cell stack 10.

The heat value Q in Equation (1) may be calculated from the output voltage Vfc of the fuel cell stack 10 detected by the voltage sensor 85 and the output current Ifc of the fuel cell stack 10 detected by the current sensor 86 according to Equation (2) given below:

$$Q=(Vth-Vfc) \cdot Ifc \times 10^{-3} \quad (2)$$

where Vth represents theoretical electromotive voltage [V] of the fuel cell stack 10.

At step S140 in a first cycle of this routine, the value of the supplied cooling medium temperature T1 used for determination of the cold state at step S130 may be used as the internal temperature Tst prior to start in Equation (1). The supplied cooling medium temperature T1 may be replaced with the discharged cooling medium temperature T2 detected by the discharge-side temperature sensor 78. Another configuration may use any other sensor configured to detect a parameter reflecting the temperature of the fuel cell stack prior to start, for example, a temperature sensor provided outside of the fuel cell system 100. At step S140 in a second or subsequent cycle of this routine, the value of T3 obtained at step S140 in a previous cycle is used as Tst.

After the processing of step S140, the controller 90 determines whether the internal temperature T3 of the fuel cell stack 10 obtained at step S140 is higher than the discharged cooling medium temperature T2 detected by the discharge-side temperature sensor 78 (step S150). In response to a negative answer or more specifically when it is determined that the internal temperature T3 of the fuel cell stack 10 is equal to or lower than the discharged cooling medium temperature T2, the controller 90 performs cold-time cooling medium circulation control with setting the circulation volume to a reduced volume (step S160).

The cold-time cooling medium circulation control changes over the setting of the rotary valve 76 provided in the cooling medium circulation system 70 to the side of opening the bypass flow path 75 to circulate the cooling medium without causing the cooling medium to pass through the radiator 71. According to this embodiment, the circulation volume is changeable among "reduced volume", "normal volume" and "increased volume". The circulation volume increases in the order of "reduced volume", "normal volume" and "increased volume". According to this embodiment, the "increased volume" is a maximum circulation volume allowable to be circulated by the hydrogen pump 56. The "normal volume" is a volume in the range of 10 to 30% of the maximum circulation volume and is set to, for example, 15%. The "reduced volume" is a volume in the range of 2 to 8% of the maximum circulation volume and is set to, for example, 5%. These volumes are only illustrative and may be any values that satisfy the magnitude relationship of reduced volume<normal volume<increased volume. The "increased volume" may be a volume different from the maximum circulation volume. The "reduced volume" corresponds to the "first circulation volume" described in Summary, the "normal volume" corresponds to the "second circulation volume" described in Summary, and the "increased volume" corresponds to the "third circulation volume" described in Summary.

Setting the circulation volume to the reduced volume at step S160 increases the rate of temperature rise in the plane of the cell 12 of the fuel cell stack 10. The increase in rate of temperature rise is attributed to the following reason. When the circulation volume of the cooling medium is set to the reduced volume, the cooling medium slowly flows in the plane of each cell 12 of the fuel cell stack 10 and receives a greater amount of heat from the cell 12. This causes the temperature at the outlet of the cooling medium to be significantly higher than the temperature at the inlet. This achieves a quick temperature rise in the cell plane. Setting the circulation volume to the reduced volume reduces the uniformity of temperature of the cooling medium in the cell plane. Continuous circulation of the cooling medium, however, ensures a certain degree of uniformity of temperature in the cell plane. After the processing of step S160, the controller 90 returns to step S140 and repeats the processing of steps S140 to S160 until it is determined at step S150 that the internal temperature T3 is higher than the discharged cooling medium temperature T2.

When it is determined at step S150 that the internal temperature T3 of the fuel cell stack 10 is higher than the discharged cooling medium temperature T2, the controller 90 performs cold-time cooling medium circulation control with setting the circulation volume to the normal volume (step S170). The cold-time cooling medium circulation control here circulates the cooling medium without causing the cooling medium to pass through the radiator 71 as described above. Setting the circulation volume to the considerably high, normal volume increases the flow rate of the cooling medium in the plane of each cell 12 and thereby improves the uniformity of temperature in the cell plane. When it is determined at step S150 that the internal temperature T3 of the fuel cell stack 10 is higher than the discharged cooling medium temperature T2, the temperature of each cell 12 of the fuel cell stack 10 is considerably increased. The controller 90 accordingly performs step S170 to improve the uniformity of temperature in the cell plane, instead of performing step S160 to increase the rate of temperature rise.

After the processing of step S170, the controller 90 determines whether the supplied cooling medium temperature T1 detected by the supply-side temperature sensor 77 is equal to the discharged cooling medium temperature T2 detected by the discharge-side temperature sensor 78 (step S180). When it is determined that the supplied cooling medium temperature T1 is not equal to the discharged cooling medium temperature T2, the controller 90 returns to step S170 to continually perform the cold-time cooling medium circulation control with setting the circulation volume to the normal volume.

When it is determined at step S180 that the supplied cooling medium temperature T1 is equal to the discharged cooling medium temperature T2, on the other hand, the controller 90 performs cold-time cooling medium circulation control with setting the circulation volume to the increased volume (step S190). The cold-time cooling medium circulation control here circulates the cooling medium without causing the cooling medium to pass through the radiator 71 as described above. According to this embodiment, the increased volume is the maximum circulation volume as described above. Setting the circulation volume to the maximum circulation volume allows for a uniform temperature rise in the stacking direction of the fuel cell stack 10. The cooling medium supplied to the fuel cell stack 10 is introduced through the cooling medium supply manifold Ms to the respective cells 12. The respective cells 12 have different accessibilities of the cooling medium according to the positions of the cells 12 in the stacking direction. A cell 12a near to the cooling medium supply port 14 has the higher accessibility of the cooling medium, while a cell 12b distant from the cooling medium supply port 14 has the lower accessibility of the cooling medium. Setting the circulation volume to the maximum circulation volume at step S190 improves the accessibility of the cooling medium with respect to all the cells 12. This accordingly allows for a uniform temperature rise in the stacking direction of the fuel cell stack 10. As described above, the increased volume may not be necessarily set to the maximum circulation volume. Even when the circulation volume is set to a volume less than the maximum circulation volume at step S190, this considerably improves the uniformity of temperature in the stacking direction of the fuel cell stack 10.

After the processing of step S190, the controller 90 determines whether the discharged cooling medium temperature T2 detected by the discharge-side temperature sensor 78 reaches a warm-up target temperature Ttg (i.e., becomes equal to or higher than Ttg) (step S200). The warm-up target temperature Ttg is, for example, 60[° C.]. When it is determined at step S200 that the discharged cooling medium temperature T2 does not reach the warm-up target temperature Ttg, the controller 90 returns to step S190 to continually perform the cold-time cooling medium circulation control with setting the circulation volume to the increased volume.

When it is determined at step S200 that the discharged cooling medium temperature T2 reaches the warm-up target temperature Ttg, on the other hand, the controller 90 proceeds to step S210 to start ordinary-time cooling medium circulation control. The ordinary-time cooling medium circulation control changes over the setting of the rotary valve 76 provided in the cooling medium circulation system 70 to the flow path side including the radiator 71 to circulate the cooling medium with causing the cooling medium to pass through the radiator 71 and is performed as cooling medium circulation control after warm-up. After starting the ordinary-time cooling medium circulation control at step S210, this start-time control routine is terminated.

When it is determined at step S130 that the supplied cooling medium temperature T1 is higher than 0[° C.], on the other hand, the controller 90 proceeds to step S210 to immediately start the ordinary-time cooling medium circulation control. The processing of step S130 to step S200 in the start-time control routine corresponds to the cold-start controller 92 shown in FIG. 1.

C. Advantageous Effects

As described above in detail, in the fuel cell system according to this embodiment, at a cold-time start, when the internal temperature T3 of the fuel cell stack 10 is equal to or lower than the discharged cooling medium temperature T2, the circulation volume of the cooling medium is set to the reduced volume. This increases the rate of temperature rise in the cell plane of the fuel cell stack 10. Subsequently, when the internal temperature T3 of the fuel cell stack 10 becomes higher than the discharged cooling medium temperature T2, the circulation volume is set to the normal volume. This improves the uniformity of temperature in the cell plane. Additionally, when the supplied cooling medium temperature T1 becomes equal to the discharged cooling medium temperature T2, the circulation volume is set to the maximum circulation volume. This achieves a uniform temperature rise in the stacking direction of the fuel cell stack 10. Accordingly, the fuel cell system 100 of this embodiment satisfies both the increase in rate of temperature rise of the fuel cell stack and the uniform temperature rise of the entire stack.

D. Modifications

Modification 1

The above embodiment and its modifications are configured to determine the heat value of the fuel cell stack 10 based on the output voltage Vfc and the output current Ifc of the fuel cell stack 10 and estimate the internal temperature T3 of the fuel cell stack 10 based on the heat value and the heat capacity of the fuel cell stack 10. This configuration is, however, not restrictive. For example, a configuration according to one modification may determine the temperature of a representative fuel cell (for example, center cell in the stacking direction) included in the fuel cell stack 10 by using a temperature sensor and obtain the determined temperature as the internal temperature. A configuration according to another modification may experimentally determine a temperature distribution of the respective fuel cells in advance and determine the temperature of a representative fuel cell (for example, center cell in the stacking direction) included in the fuel cell stack 10 by using a temperature sensor. The configuration may subsequently correct the determined temperature according to the temperature distribution and obtain the corrected temperature as the internal temperature. In summary, any configuration may be employed to obtain the internal temperature that denotes the temperature inside of the fuel cell stack.

Modification 2

The above embodiment and its modifications describe the fuel cell system mounted on the vehicle. This is, however, not restrictive, but the invention is applicable to various moving bodies such as two wheels, ships and boats, aircraft and robots. The invention is not limited to the fuel cell system mounted on any of such moving bodies but is also applicable to a stationary fuel cell system and a portable fuel cell system.

Modification 3

The above embodiment and its modifications employ polymer electrolyte fuel cells for the fuel cell stack, but the invention is applicable to various fuel cells such as phosphoric acid fuel cells, molten carbonate fuel cells and solid oxide fuel cells.

The invention is not limited to any of the embodiments, their modified examples and the modifications described above but may be implemented by a diversity of configurations without departing from the scope of the invention. For example, the technical features of any of the embodiments, their modified examples and the modifications corresponding to the technical features of the respective aspects described in Summary may be replaced or combined appropriately, in order to solve part or all of the problems described above or in order to achieve part or all of the advantageous effects described above. Components other than those described in independent claims among components of any of the embodiments, their modified examples and the modifications are additional components and may be omitted appropriately.

| Reference Signs List | |
|---|---|
| 10 | fuel cell stack |
| 12 | cell |
| 14 | cooling medium supply port |
| 16 | cooling medium discharge port |
| 50 | hydrogen gas supply-discharge system |
| 51 | hydrogen tank |
| 52 | pressure reducing valve |
| 53 | hydrogen gas supply path |
| 54 | pressure regulator |
| 55 | anode off-gas path |
| 56 | hydrogen pump |
| 57 | off-gas discharge path |
| 58 | on-off valve |
| 60 | oxidizing gas supply-discharge system |
| 61 | air compressor |
| 62 | oxidizing gas supply path |
| 63 | cathode off-gas path |
| 70 | cooling medium circulation system |
| 71 | radiator |
| 72 | circulation pump |
| 73 | cooling medium supply flow path |

| | -continued | |
|---|---|---|
| Reference Signs List | | |
| 74 | cooling medium discharge flow path | |
| 75 | bypass flow path | |
| 76 | rotary valve | |
| 77 | supply-side temperature sensor | |
| 78 | discharge-side temperature sensor | |
| 80 | power output system | |
| 81 | motor | |
| 82 | motor controller | |
| 83 | electric wiring | |
| 85 | voltage sensor | |
| 86 | current sensor | |
| 90 | controller | |
| 91 | internal temperature estimator | |
| 92 | cold-start controller | |
| 99 | start switch | |
| 100 | fuel cell system | |
| T1 | supplied cooling medium temperature | |
| T2 | discharged cooling medium temperature | |
| T3 | internal temperature | |
| Me | cooling medium discharge manifold | |
| Ms | cooling medium supply manifold | |
| Vfc | output voltage | |
| Ifc | output current | |
| Ttg | warm-up target temperature | |

The invention claimed is:

1. A fuel cell system, comprising:
a fuel cell stack that is configured to have a cooling medium supply port and a cooling medium discharge port;
a circulation flow path that is arranged to return a cooling medium which is discharged from the cooling medium discharge port, to the cooling medium supply port;
a pump that is provided to drive the cooling medium in the circulation flow path and thereby circulate the cooling medium to inside of the fuel cell stack, the pump being configured to vary a circulation volume of the cooling medium;
a supply-side temperature sensor that is configured to detect a supplied cooling medium temperature which is temperature of the cooling medium supplied to the cooling medium supply port;
a discharge-side temperature sensor that is configured to detect a discharged cooling medium temperature which is temperature of the cooling medium discharged from the cooling medium discharge port; and
a cold-start controller that is programmed to control the circulation volume of the cooling medium by the pump at a cold start of the fuel cell stack, wherein
the cold-start controller is programmed to
obtain a fuel cell internal temperature which shows temperature inside of the fuel cell stack,
control the circulation volume of the cooling medium to a first circulation volume, when the fuel cell internal temperature is not greater than the discharged cooling medium temperature, and control the circulation volume of the cooling medium to a second circulation volume that is greater than the first circulation volume, when the fuel cell internal temperature is greater than the discharged cooling medium temperature, and control the circulation volume of the cooling medium to a third circulation volume that is greater than the second circulation volume, when the supplied cooling medium temperature becomes equal to the discharged cooling medium temperature after the control of the circulation volume to the second circulation volume.

2. The fuel cell system according to claim 1,
wherein the cold-start controller is programmed to
obtain a heat value of the fuel cell stack based on an output voltage and an output current of the fuel cell stack and estimate the fuel cell internal temperature based on the heat value and a heat capacity of the fuel cell stack, so as to obtain the fuel cell internal temperature.

3. The fuel cell system according to claim 1,
wherein the cold-start controller is programmed to
terminate the control of the circulation volume of the cooling medium at the cold start, when the discharged cooling medium temperature reaches a predetermined warm-up target temperature.

4. The fuel cell system according to claim 1,
wherein the third circulation volume is a maximum circulation volume by the pump.

5. A control method of a fuel cell system, the fuel cell system comprising a fuel cell stack that is configured to have a cooling medium supply port and a cooling medium discharge port; a circulation flow path that is arranged to return a cooling medium which is discharged from the cooling medium discharge port, to the cooling medium supply port; a pump that is provided to drive the cooling medium in the circulation flow path and thereby circulate the cooling medium to inside of the fuel cell stack, the pump being configured to vary a circulation volume of the cooling medium; a supply-side temperature sensor that is configured to detect a supplied cooling medium temperature which is temperature of the cooling medium supplied to the cooling medium supply port; and a discharge-side temperature sensor that is configured to detect a discharged cooling medium temperature which is temperature of the cooling medium discharged from the cooling medium discharge port,
the control method comprising:
at a cold start of the fuel cell stack,
obtaining a fuel cell internal temperature which is temperature inside of the fuel cell stack;
controlling the circulation volume of the cooling medium by the pump to a first circulation volume, when the fuel cell internal temperature is not greater than the discharged cooling medium temperature, and control the circulation volume of the cooling medium to a second circulation volume that is greater than the first circulation volume, when the fuel cell internal temperature is greater than the discharged cooling medium temperature; and
controlling the circulation volume of the cooling medium to a third circulation volume that is greater than the second circulation volume, when the supplied cooling medium temperature becomes equal to the discharged cooling medium temperature after the control of the circulation volume to the second circulation volume.

* * * * *